(12) United States Patent
Hardå et al.

(10) Patent No.: US 12,246,756 B2
(45) Date of Patent: Mar. 11, 2025

(54) METHODS AND SYSTEMS FOR HAND-OVER FROM AND ADS FEATURE TO A DRIVER OF A VEHICLE

(71) Applicant: ZENUITY AB, Gothenburg (SE)

(72) Inventors: Peter Hardå, Torslanda (SE); Mattias Brännström, Gothenburg (SE)

(73) Assignee: Zenuity AB, Gothenburg (SE)

( * ) Notice: Subject to any disclaimer, the term of this patent is extended or adjusted under 35 U.S.C. 154(b) by 96 days.

(21) Appl. No.: 17/224,477

(22) Filed: Apr. 7, 2021

(65) Prior Publication Data

US 2021/0316765 A1  Oct. 14, 2021

(30) Foreign Application Priority Data

Apr. 8, 2020 (EP) ..................................... 20168622

(51) Int. Cl.
*B60W 60/00* (2020.01)
*B60K 35/00* (2024.01)
(Continued)

(52) U.S. Cl.
CPC ......... *B60W 60/0059* (2020.02); *B60K 35/00* (2013.01); *B60W 60/0015* (2020.02);
(Continued)

(58) Field of Classification Search
CPC ......... B60W 60/0059; B60W 60/0015; B60W 60/0055; B60W 60/0061; B60W 2050/146; B60W 50/082; B60W 50/14; B60W 2540/26; B60W 2540/30; B60W 2556/10; B60W 60/0053; B60W 2540/00; B60K 35/00; B60K 2370/11; B60K 2370/152;
(Continued)

(56) References Cited

U.S. PATENT DOCUMENTS 11,993,292 B2 * 5/2024 Namba ............ B60W 60/0059
2016/0214483 A1 7/2016 Kleen et al.
(Continued)

OTHER PUBLICATIONS

Extended European Search Report mailed Sep. 8, 2020 for European Patent Application No. 20168622.7, 7 pages.

*Primary Examiner* — Brian P Sweeney
*Assistant Examiner* — Alexander George Matta
(74) *Attorney, Agent, or Firm* — Sage Patent Group

(57) ABSTRACT

A method for managing a hand-over from an Automated Driving System (ADS) to driver of vehicle, where ADS includes ADS feature being associated with first set of pre-cautionary constraints out of plurality of pre-cautionary constraints imposed by Pre-cautionary Safety (PCS) module while ADS feature controls vehicle. The method includes obtaining request to deactivate ADS feature, and providing partial control of vehicle to driver in order to enable manual driver operation of vehicle based on obtained request. The method includes monitoring manual driver operation of vehicle for a time period, and evaluating monitored manual driver operation of vehicle against second set of pre-cautionary constraints during time period. Then, based on evaluation, the method includes deactivating second set of pre-cautionary constraints upon expiry of time period if manual driver operation passes evaluation, or providing control of vehicle to ADS if manual driver operation fails evaluation.

17 Claims, 4 Drawing Sheets

(51) Int. Cl.
     *B60K 35/10*     (2024.01)
     *B60K 35/22*     (2024.01)
     *B60K 35/28*     (2024.01)

(52) U.S. Cl.
     CPC .... *B60W 60/0055* (2020.02); *B60W 60/0061* (2020.02); *B60K 35/10* (2024.01); *B60K 35/22* (2024.01); *B60K 35/28* (2024.01); *B60K 2360/11* (2024.01); *B60K 2360/172* (2024.01)

(58) Field of Classification Search
     CPC ...... B60K 2370/172; B60K 2370/1523; B60K 2370/176; B60K 2370/178; B60K 2370/179; B60K 2370/175
     See application file for complete search history.

(56) References Cited

U.S. PATENT DOCUMENTS

| | | | |
|---|---|---|---|
| 2018/0039268 A1* | 2/2018 | Mangal | B60W 30/12 |
| 2018/0120839 A1 | 5/2018 | Hasberg et al. | |
| 2018/0222318 A1* | 8/2018 | Petermann-Stock | G01C 21/3697 |
| 2018/0362052 A1 | 12/2018 | Matsumoto | |
| 2019/0056732 A1* | 2/2019 | Aoi | B60W 40/08 |
| 2019/0278268 A1* | 9/2019 | Rezaeian | G05D 1/0061 |
| 2019/0300013 A1* | 10/2019 | Shiraishi | B60W 60/0053 |
| 2020/0180661 A1* | 6/2020 | Honda | B60W 60/0054 |
| 2020/0290646 A1* | 9/2020 | Safour | B60W 50/14 |
| 2021/0107498 A1* | 4/2021 | Liu | B60W 60/0053 |
| 2021/0107504 A1* | 4/2021 | Shtrom | A61B 5/0507 |
| 2021/0188289 A1* | 6/2021 | Oba | B60W 40/08 |

* cited by examiner

METHODS AND SYSTEMS FOR HAND-OVER FROM AND ADS FEATURE TO A DRIVER OF A VEHICLE

CROSS-REFERENCE TO RELATED APPLICATIONS

The present application for patent claims priority to European Patent Office Application Ser. No. 20168622.7, entitled "METHODS AND SYSTEMS FOR HAND-OVER FROM AND ADS FEATURE TO A DRIVER OF A VEHICLE" filed on Apr. 8, 2020, assigned to the assignee hereof, and expressly incorporated herein by reference.

TECHNICAL FIELD OF THE INVENTION

The present disclosure relates to Automated Driving Systems (ADS) for road vehicle such as cars, busses, and trucks. More specifically, the present disclosure relates to methods and systems for managing a hand-over from an ADS feature to a driver of a vehicle.

BACKGROUND

During these last few years, the development of autonomous vehicles has exploded and many different solutions are being explored. Today, development is ongoing in both autonomous driving (AD) and advanced driver-assistance systems (ADAS), i.e., semi-autonomous driving, within a number of different technical areas within these fields. One such area is how to ensure that a hand-over from an ADS feature to a driver of the vehicle is executed in a safe and reliable manner.

It is envisioned that during autonomous driving, an occupant of the vehicle will be able to devote himself at least partially to other activities. However, still today there are no available autonomous solutions that are fully capable of performing autonomous driving in all scenarios, and at all road sections. Accordingly, at least for the time being, when an Automated Driving System (ADS) feature recognizes an upcoming road or traffic scenario where the feature might have a limited performance, the feature will then ask the occupant (i.e., driver) to take over control of the vehicle. This may also be triggered by one or more sensors or other subsystems of the vehicle detecting a performance degradation or an outright failure of the ADS feature wherefore a handover request (hand-over) to the driver may be initiated. It is also envisioned that the request to take over control of the vehicle may be a remote request e.g., due to an accident that has occurred in the planned route of the vehicle. The taking over of control of the vehicle is often referred to as a handover/hand-off.

There is accordingly a need for new and improved solutions to ensure that a driver of an autonomous vehicle, i.e., a vehicle operating with an ADS feature having an automation level of 3 or higher according to the SAE J3016 levels of driving automation, is prepared to retake control when automation needs to be ended.

SUMMARY OF THE INVENTION

It is therefore an object of the present disclosure to provide a method for managing a hand-over from an Automated Driving System (ADS) to a driver of a vehicle, a computer-readable storage medium, a system, and a vehicle comprising such a system which alleviate all or at least one of the drawbacks of presently known solutions.

In particular it is an object of the present disclosure to provide a solution for reliable and safe hand-over from an ADS to a driver of the vehicle.

This object is achieved by means of a method for managing a hand-over from an Automated Driving System (ADS) to a driver of a vehicle, a computer-readable storage medium, a system, and a vehicle comprising such a system as defined in the appended claims. The term exemplary is in the present context to be understood as serving as an instance, example or illustration.

According to a first aspect of the present disclosure, there is provided a method for managing a hand-over from an Automated Driving System (ADS) to a driver of a vehicle, where the ADS comprises an ADS feature being associated with a first set of pre-cautionary constraints out of a plurality of pre-cautionary constraints imposed by a Pre-cautionary Safety (PCS) module while the ADS feature controls the vehicle. The method comprises obtaining a request to deactivate the ADS feature, and providing partial control of the vehicle to the driver in order to enable manual driver operation of the vehicle based on the obtained request. The partial control comprises (at least) access to steering, acceleration, and braking of the vehicle while the PCS module imposes a second set of pre-cautionary constraints out of the plurality of pre-cautionary constraints for the driver while the driver has partial control of the vehicle. Furthermore, the method comprises monitoring the manual driver operation of the vehicle for a time period, and evaluating the monitored manual driver operation of the vehicle against the second set of pre-cautionary constraints during the time period. Then, based on the evaluation, the method comprises deactivating the second set of pre-cautionary constraints upon the expiry of the time period if the manual driver operation passes the evaluation, or providing control of the vehicle to the ADS if the manual driver operation fails the evaluation. By deactivating the second set of pre-cautionary constraints the driver is consequently given "full control" of the vehicle.

Currently known concepts for attention detection when the driver is not actively driving the vehicle are based on observing the driver eyes. This may be understood as an indirect assessment of the driver ability to control the vehicle. The herein disclosed method offers a direct assessment of the driver's actual ability to control the vehicle safely, thereby reducing the risk of "unfair" transitions of control to a driver, i.e., transitions to an unprepared driver. It is assumed that oftentimes the driver may not be able to correctly assess his/her own ability at time of deactivation request, wherefore a solution for an automated and direct assessment of the driver's ability to take over control is needed and disclosed herein. Also, the herein disclosed principles may efficiently serve as an addition rather than an alternative to other currently known solutions for assessing the driver's ability to take over control of the vehicle, in order to improve the overall confidence of the assessment.

In short, the herein disclosed method utilizes the same function responsible for making sure that the ADS (during autonomous drive) operates within the pre-set safety margins in order to evaluate the driver's readiness for taking over control of the vehicle. This provides for a simplified and efficient design of a hand-over function when going from Autonomous Drive (AD) to manual operation of the vehicle. Thus, no independent system is required to be integrated and installed into the vehicle, but instead a tweaking and partial re-purposing of currently existing functions.

According to a second aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, according to a third aspect of the present disclosure there is provided a system for managing a hand-over from an ADS to a driver of the vehicle, where the ADS comprises an ADS feature. The system comprises a Pre-Cautionary Safety (PCS) module configured to impose a first set of constraints for the ADS feature while the ADS feature controls the vehicle. The system further comprises control circuitry configured to obtain a request to deactivate the ADS feature (while the ADS feature is actively controlling the vehicle), and to provide partial control of the vehicle to the driver in order to enable manual driver operation of the vehicle based on the obtained request. The partial control comprises access to steering, acceleration, and braking of the vehicle while the PCS module imposes a second set of pre-cautionary constraints out of the plurality of pre-cautionary constraints for the driver while the driver has partial control of the vehicle. The control circuitry is further configured to monitor the manual driver operation of the vehicle for a time period, evaluate the monitored manual driver operation of the vehicle against the second set of pre-cautionary constraints during the time period, and to deactivate the second set of pre-cautionary constraints if the manual driver operation passes the evaluation, or provide control of the vehicle to the ADS if the manual driver operation fails the evaluation. With this aspect of the disclosure, similar advantages and preferred features are present as in the previously discussed first aspect of the disclosure.

Still further, in accordance with a fourth aspect of the present disclosure, there is provided a vehicle comprising an ADS module comprising an ADS feature configured to control steering, acceleration, and braking of the vehicle within a predefined Operational Design Domain, ODD, and a system for managing a hand-over from an ADS to a driver of the vehicle according to any one of the embodiments disclosed herein. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
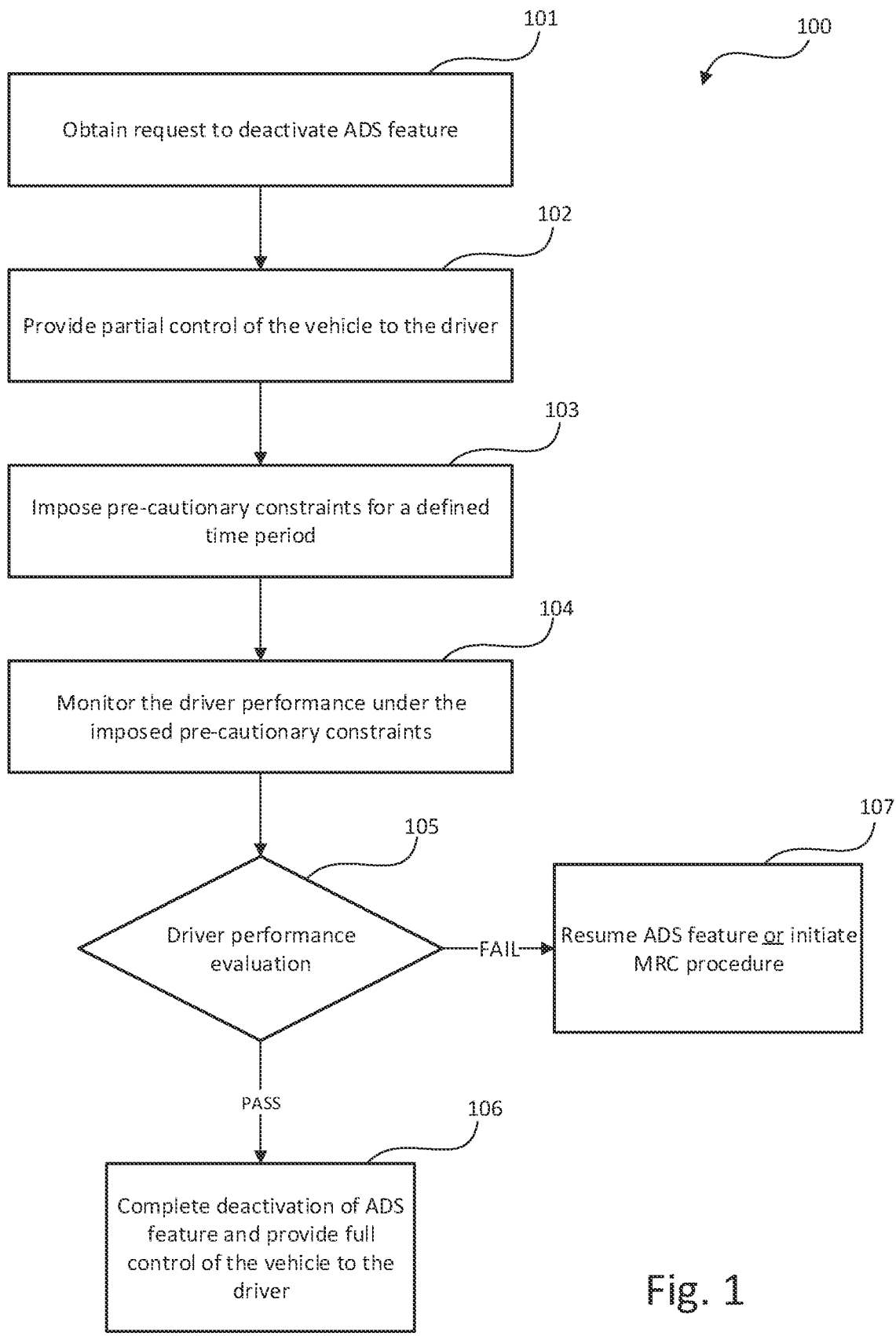
FIG. 1 is a schematic flow chart representation of a method for managing a hand-over from an ADS feature to a driver of a vehicle in accordance with an embodiment of the present disclosure.

FIG. 1 shows a schematic flow chart representation of a method 100 for managing a hand-over from an Autonomous Driving System (ADS) to a driver of the vehicle in accordance with an embodiment of the present disclosure. The ADS comprises an ADS feature that is preferably a level 3 feature or higher according to SAE J3016 levels of driving automation for on-road vehicles. The ADS feature may for example be a traffic jam pilot, a highway pilot, or any other SAE J3016 level 3+ ADS feature.

Furthermore, the ADS feature is associated with a first set of pre-cautionary constraints out of a plurality of pre-cautionary constraints imposed by a Pre-cautionary Safety (PCS) module while the ADS feature controls the vehicle. The PCS module may be construed as a monitoring system responsible for setting a set of constraints or safety-margins for a controlling entity of the vehicle, such as e.g. speed limitations, distance to lead-vehicle, in-lane positioning, brake timing, curve speed, curve exit acceleration, gap size for lane change, execution time for lane change, distance to road edge, steering angle limitations, lateral acceleration limitations, lateral jerk limitations, longitudinal jerk limitations, lateral distance to other objects, etc. The first set of pre-cautionary constraints may be specific for a type of ADS feature, type of environmental scenario of the vehicle, etc. Accordingly, the first set of pre-cautionary constraints may be selected from the plurality of pre-cautionary constraints based on type of ADS feature and/or environmental scenario.

Furthermore, the ADS feature may be Operational Design Domain (ODD) specific, i.e., each ADS feature may be associated with an ODD. An Operational design domain (ODD) is to be understood as a description of the operating domains in which an automated or a semi-automated driving system (i.e., AD or ADAS) is designed to function, including, but not limited to, geographic, roadway (e.g. type, surface, geometry, edges and markings), environmental parameters, connectivity, surrounding objects, and speed limitations. That is, the ADS feature may be associated with a specific environmental scenario and only configured to operate within an environment fulfilling a set of scenario parameters, example scenarios are traffic jams, highway/expressway cruising, etc. The ODD may further define an allowable exposure rate to driving scenarios and their dynamics (e.g., traffic lights, intersections, jaywalkers, snow, ice, cut-ins, large animals, etc.). The scenario parameters may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of road work, and so forth.

Moving on, the method 100 comprises obtaining 101 a request to deactivate the ADS feature. The request may for example be a driver-initiated request obtained from a Human-Machine-Interface (HMI) or a machine-initiated request. The driver-initiated request may for example be obtained from an input device (e.g., a button of an infotainment system) or from a manual-override detection where a driver of the vehicle actively engages with the steering wheel, accelerator, or brake. Moreover, a machine-initiated request may for example be based on sensor data indicative of the exit from the ODD associated with the ADS feature. In more detail, it may be detected, by means of one or more sensors, that the vehicle is about to exit the ODD that the currently active ADS feature is configured for and whereupon a machine-initiated hand-over request is initiated. This may be referred to as an "ODD-exit". In more detail, as the situation is today, the vehicle may not hand over control to the driver (not even partial control) unless it is confirmed by the driver. Thus, a "machine-initiated" hand-over may be interpreted as a two-step action where the vehicle requests the driver to request manual control of the vehicle. Another example of an ODD exit event may be a signal generated by an algorithm configured to limit an exposure rate to one or more dynamic parameters of a scenario (e.g., intersections. Jaywalkers, snow, ice, traffic lights, etc.) rather than eliminating the exposure to these dynamics completely.

Further, the method 100 comprises providing 102 partial control of the vehicle to the driver in order to enable manual driver operation of the vehicle upon obtaining 101 the request or based on the obtained 101 request. The partial control comprises (at least) access to steering, acceleration, and braking of the vehicle while the PCS module imposes 103 a second set of pre-cautionary constraints of the plurality of pre-cautionary constraints for the driver while the driver has partial control of the vehicle. The second set of pre-cautionary constraints may for example be a subset of the first set of pre-cautionary constraints. More specifically, the second set of pre-cautionary constraints are preferably less constraining or less strict than the first set of pre-cautionary constraints. However, in some embodiments the first set of constraints and the second set of constraints may be the same. Stated differently, the driver is given partial control by having access to primary controls (steering and gas/brake) while "autonomous drive comfort control" is disengaged, all the while some or all safety limits from pre-cautionary safety still being active and in control, i.e. the driver is not allowed to violate them. In some embodiments, the partial control comprises access to at least one of steering, acceleration, and braking of the vehicle while the PCS module imposes 103 a second set of pre-cautionary constraints of the plurality of pre-cautionary constraints for the driver while the driver has partial control of the vehicle.

Moreover, the second set of pre-cautionary constraints may be dynamically set depending on the type of the obtained request (driver-initiated or machine-initiated), the type of driver initiated request. In reference to the latter the second set of pre-cautionary constraints may be different depending on if the handover request originates from a button-press of the driver or if it originates from the driver actively taking control of the vehicle (e.g., by steering input).

In some embodiments the second set of pre-cautionary constraints comprises a sub-set of pre-cautionary constraints of the first set of pre-cautionary constraints, a smaller number of pre-cautionary constraints than the first set of pre-cautionary constraints, or a higher threshold for at least one pre-cautionary constraint out of the first set of pre-cautionary constraints. A higher threshold of one or more pre-cautionary constraints should in the present context be interpreted as more permissive or more tolerant than the first set of pre-cautionary constraints. For example, the first set of pre-cautionary constraints may for example comprise a first gap range in which the vehicle is allowed to switch lanes in order to overtake a preceding vehicle, while the second set of pre-cautionary constraints may comprise a second gap range (higher than the first gap range) or not comprise any gap range at all. In yet another example, the first set of constraints may comprise a first speed limit that the vehicle is allowed to have while the second set of constraints may comprise a second speed limit (higher than the first speed limit) that the vehicle is allowed to have or alternatively not have any speed limit constraint at all.

The method 100 further comprises monitoring the manual driver operation of the vehicle for a (predefined) time period. The time period may for example be in the range of 10 seconds to 60 seconds. Moreover, the time period may be dynamically set based on type of ADS feature (that is being deactivated), on the current ODD of the vehicle, a driver profile (experience level) or the like. For example, the time period may be set based on a duration of time that the ADS was active prior to the request to deactivate the ADS feature. For example, the time period may be longer if the ADS feature had previously been active for X minutes than if the ADS feature had previously been active for Y minutes, where X>Y. Further, the monitored 104 manual driver operation is evaluated 105 against the second set of pre-cautionary constraints during the time period. In some embodiments, the monitoring 104 and the evaluation 105 may be understood as concurrent steps, i.e., performed substantially simultaneously.

In the present context, the evaluation 105 comprises monitoring whether or not the driver that has been provided 102 with partial control violates any one of the constraints comprised in the second set of pre-cautionary constraints. For example, if the second set of pre-cautionary constraints comprises a constraint indicative of a minimum distance to road edge, and if the driver crosses this minimum distance, then the PCS module may be configured to conclude that the driver is unfit for operating the vehicle and generate a fail result of the evaluation 105. Another way of describing this process is that hand-over of control from the ADS feature to the driver is conditioned by the driver being able to control the vehicle within safety margins set out by the ADS. Thus, the same module or function that is responsible for monitoring the ability of the ADS feature to operate the vehicle safely is used to perform an evaluation of the driver's ability to operate the vehicle safely. Thereby providing a less complex and more efficient solution as compared to having a separate "driver-evaluation" function. Moreover, when used in co-operation with a Driver Monitoring System, the herein proposed solution adds further redundancy to the whole driver suitability assessment procedure.

Accordingly, the method 100 further comprises deactivating 106 the second set of pre-cautionary constraints upon the expiry of the time period if the manual driver operation passes the evaluation 105. In other words, if the driver passes the evaluation 105 he is given full control of the vehicle without the second set of pre-cautionary constraints active. However, in some embodiments other safety constraints may still be active (e.g., a lane support system (LSS) such as e.g., Lane Keep Assist (LKA), or collision warning systems), but with the distinction that the manual driver operation is not evaluated against these safety constraints.

However, if the manual driver operation fails the evaluation 105, the method 100 comprises a step of providing 107 control of the vehicle to the ADS of the vehicle. The step of providing 107 control of the vehicle to the ADS may for example comprise resuming control of the vehicle to the (previously active) ADS feature, or bringing the vehicle to a Minimal Risk Condition (MRC). In reference to the latter, this may for example be the case if the vehicle is about to leave the ODD for which the ADS feature is configured wherefore the option of resuming the control of the vehicle to that ADS feature may not be available. However, in some embodiments, the step of providing 107 control of the vehicle to an automated system comprises providing control of the vehicle to another ADS feature of the vehicle. For example if the vehicle goes from a traffic-jam scenario to highway cruising scenario, and an evaluation 105 is performed in a transition from the traffic-jam scenario to the high-way cruising scenario, then the step of providing 107 control of the vehicle may comprise providing control of the vehicle to a highway pilot ADS feature of the vehicle. Thus, in some embodiments, the "deactivated" ADS feature is set to a "passive mode" or "sleep mode" where it still runs in the background while the driver has partial control of the vehicle in order to be able to quickly resume control of the vehicle based on the evaluation 105.

In some embodiments, the second set of pre-cautionary constraints comprises different types of pre-cautionary constraints, where a violation of a pre-cautionary constraint during the monitoring 104 and evaluation 105 results in different consequences depending on what type of pre-cautionary constraint was violated. For example, the second set of pre-cautionary constraints two groups of constraints, each group associated with a specific type (e.g., critical and non-critical) such that a violation of a "critical" pre-cautionary constraint results in an immediate handover back to the ADS, while a violation of a "non-critical" pre-cautionary constraint results in a reduced evaluation score and/or in an extension of the time period for monitoring 104 and evaluation 105. In the latter scenario, the ADS may perform an intervention (e.g., make sure vehicle stays in lane) without aborting the "driver evaluation/assessment".

Moreover, in some embodiments the step of evaluating 105 the monitored 104 driver operation comprises "continuously" evaluating the monitored 104 manual driver operation during the time period. The term continuously is in the present context to be interpreted broadly and is not to be limited according to the mathematical definition of the term "continuous", but encompasses evaluating by means of digital signals and sampling of data. More specifically, the term "continuous evaluation" is to be understood as that the performance of the driver is evaluated during the (full) time period or at least until a violation of the second set of pre-cautionary constraints is detected. The latter option provides for a safer hand-over execution since the "evaluation" can be cut short upon detection of a violation of the second set of pre-cautionary constraints, i.e., if it is detected that the driver violated one or more safety-critical constraints. In such a scenario, one may re-activate the ADS or activate a Dynamic Driving Task (DDT) fall-back that brings the vehicle to a Minimal Risk Condition (MRC) in order to reduce the risk of the vehicle colliding with an external object or the vehicle running off the road. Thus, the evaluation 105 does not necessarily have to run for the full time period if a violation of the second set of pre-cautionary constraints is detected during the evaluation 105.

The ADS of the vehicle generally comprises an MRC feature or MRC protocol whereby the ADS if configured to bring the vehicle to a location or condition in order to minimize the risk of a collision or accident when a given trip/action cannot or should not be completed. In the present context this may be initiated when the hand-over to the driver cannot/should not be completed.

Pre-cautionary safety may be understood as a part of the Autonomous Driving (AD) control software that continuously evaluates safety margins for lateral and longitudinal control based on all available sensor data. While AD is normally active, pre-cautionary safety is used to ensure safe driving of the AD system by laying out borders that other control layers (of the AD) must respect. The present inventors realized that it may be advantageous to utilize this function in order to provide a direct assessment of the driver's ability to control the vehicle safely and thereby reduce the risk of "unfair" transitions of control to an unprepared/unsuitable driver. Thus, in contrast to other solutions where indirect assessment is used to evaluate the driver's ability by means of for example gaze monitoring, the present disclosure provides for a direct assessment of the driver's ability to operate the vehicle. In other words, the herein proposed method and system relies on hand-over of control from the ADS to the driver conditioned by the driver being able to control the vehicle within safety margins set out by the ADS. In other words, the same function responsible for making sure that the ADS (during autonomous drive) operates within the pre-set safety margins is utilized to evaluate the driver's readiness for taking over control of the vehicle.

Executable instructions for performing these functions are, optionally, included in a non-transitory computer-readable storage medium or other computer program product configured for execution by one or more processors.

Figure 2:
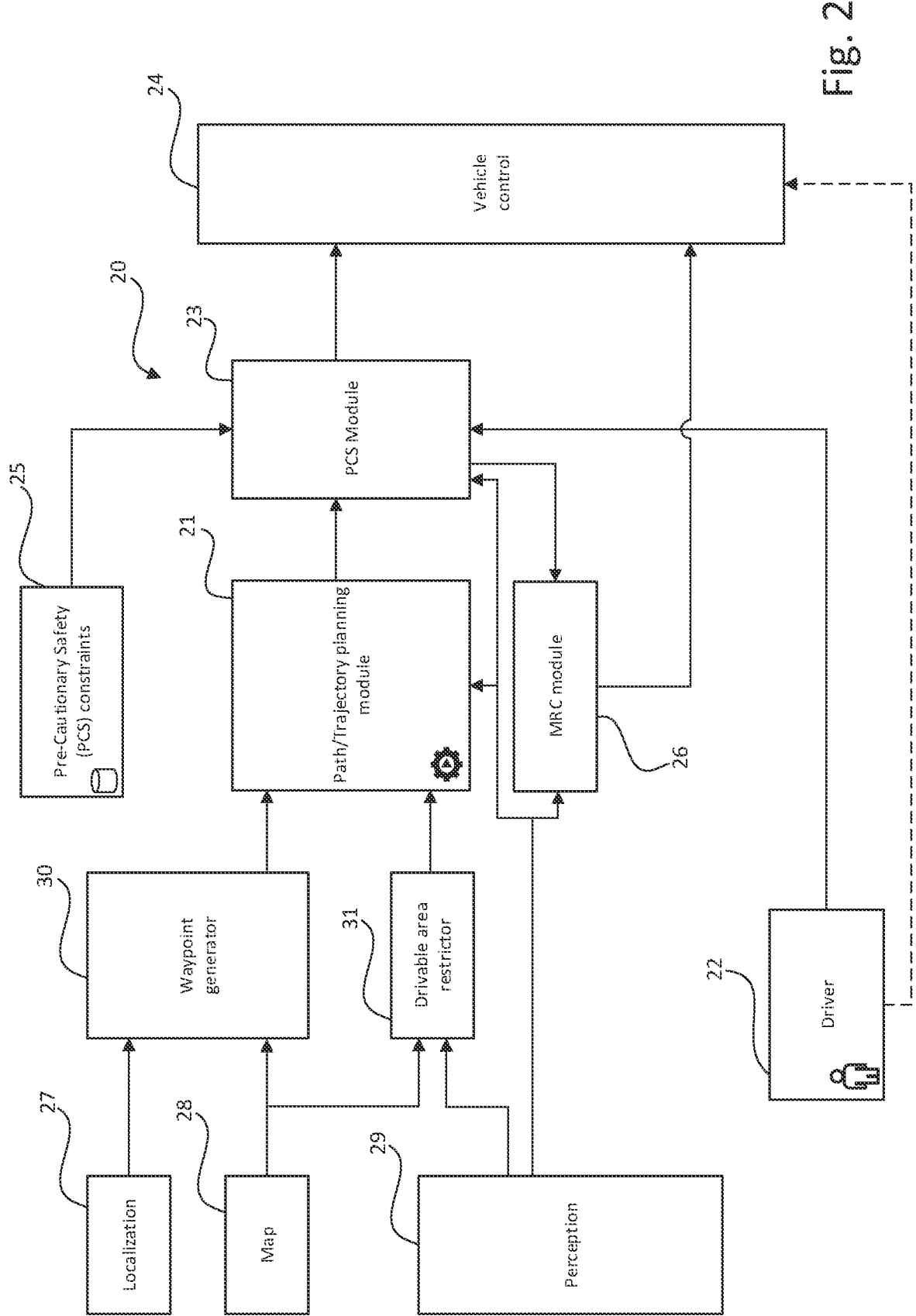
FIG. 2 is a schematic block diagram representation of a system for managing a hand-over from an ADS feature to a driver of a vehicle in accordance with an embodiment of the present disclosure.

FIG. 2 is a schematic block diagram representation of a system 20 for managing a hand-over from an ADS 20 to a driver 22 of a vehicle. The ADS comprises an ADS feature, here generalized as a path planning or trajectory planning module 21. Further the system 20 has a Pre-Cautionary Safety (PCS) module 23 configured to impose a first set of pre-cautionary constraints for the ADS feature 21 while the ADS feature controls the vehicle. This is indicated by the connection between the ADS feature 21 and the vehicle control box 24 via the PCS module 23 which monitors the performance of the ADS feature against the first set of pre-cautionary constraints. The first set of pre-cautionary constraints may for example be a subset from a plurality of pre-cautionary constraints stored in a memory or database 25, here illustrated as a separate block 25 but may be an integrated part of the PCS module 23. As mentioned, the PCS module 23 may be understood as a part of the ADS software that continuously evaluates safety margins for lateral and longitudinal control based on all available sensor data.

Further peripherals and modules of the vehicle are indicated in FIG. 2 for completeness. Accordingly, the vehicle may further have a localization module (e.g., a GNSS unit) for providing localization data (i.e. a geographical position) 27 of the vehicle and a map module for providing a HD map 28. The position 27 of the vehicle and the HD map data 28 are used as input for a waypoint generator 30 configured to generate waypoints for the path planning module 21. The vehicle may further have a perception system comprising one or more sensor device configured to monitor the surrounding environment of the vehicle. A perception system is in the present context to be understood as a system responsible for acquiring raw sensor data from on sensors such as cameras, LIDARs and RADARs, ultrasonic sensors, and converting this raw data into scene understanding. The sensor data 29 is used together with the map data 28 to form/generate a drivable area 31 in order to impose some restrictions for the path planning module 21. Furthermore, the sensor data 29 is used as input for an MRC module 26 of the ADS system 20 in order to be able to execute e.g., a fall-back stop manoeuvre in case of an impending collision. The MRC function 26 may however be provided as a separate module/function as a whole or in parts outside of the "ADS system" 20.

The system 20 further has control circuitry configured to obtain a request to deactivate the ADS feature 21 (while the ADS feature is active). As mentioned, the request may be a driver-initiated request obtained from a Human-Machine-Interface (HMI) or a machine-initiated request. Further, the system 20 is configured to provide partial control of the vehicle to the driver 22 in order to enable manual driver operation of the vehicle based on the obtained request. The partial control comprises access to steering, acceleration, and braking of the vehicle while the PCS module 23 imposes a second set of pre-cautionary constraints out of the plurality of pre-cautionary constraints for the driver 22 while the driver 22 has partial control of the vehicle.

Further, the control circuitry is configured to monitor the manual driver operation for a time period, and to evaluate the monitored manual driver operation against the second set of pre-cautionary constraints during the time period. The time period may be pre-defined or dynamically set based on a current environmental scenario of the vehicle, and may be in the range of 10 to 60 seconds. This is indicated by the connection between the "driver" 22 and the vehicle control box 24 via the PCS module 23, which monitors and evaluates the manual driver operation against the second set of pre-cautionary constraints. Then, the control circuitry is configured to deactivate the second set of pre-cautionary constraints, i.e., provide "full control" of the vehicle to the driver as indicate by the broken arrow connection, if the manual driver operation passes the evaluation. However, the control circuitry is also configured to provide control of the vehicle to the ADS 20 if the manual driver operation fails the evaluation. Thus, upon completion of the time period or upon a detection of a violation of the second set of pre-cautionary constraints, the control circuitry is configured to provide full control to the driver 22, resume the ADS feature 21, or initiate a safety protocol (e.g., MRC).

Figure 3:
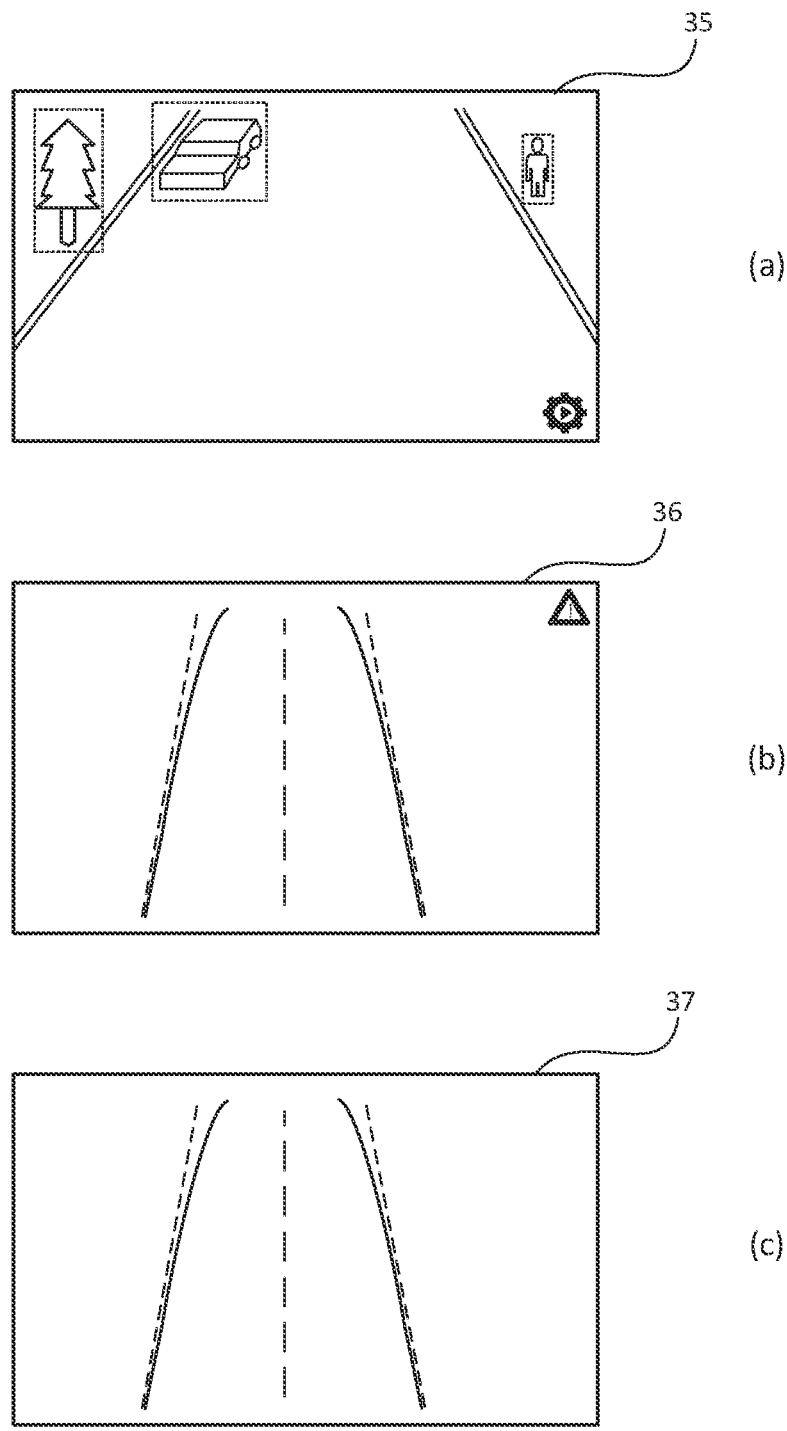
FIG. 3 is a set of schematic illustrations of an HMI of a vehicle comprising a system for managing a hand-over from an ADS feature to a driver of a vehicle in accordance with an embodiment of the present disclosure.

Moving on, FIG. 3 shows three schematic user interfaces (UIs) 35-37 displayed on a display apparatus in accordance with some embodiments of the present disclosure. Accordingly, the control circuitry of the system is further configured to at an electronic device with a display apparatus display on the display apparatus a user interface 35-37. The electronic device with a display may for example be a display of an infotainment system inside the vehicle, or a display of a dashboard of the vehicle. In more detail, the user interface comprises a graphical representation of a first user interface 35 while the ADS feature controls the vehicle, a graphical representation of a second user interface 36 while the driver has partial control of the vehicle, and a graphical representation of a third user interface 37 when the second set of pre-cautionary constraints are deactivated (i.e., when the driver has "full control" of the vehicle). The first, second, and third user interfaces 35-37 are different so to indicate for the driver when the different modes are active.

In more detail, the second user interface 36, i.e., the interface that is displayed when the driver has "partial control", is preferably very similar to the third user interface 37, differing in that the second user interface 36 has at least one graphical element indicative that the driver is "under evaluation". This is in order to improve the human-machine interaction and to avoid situations where the driver does not understand why he/she wasn't given full control of the vehicle. In more detail, by indicating that the driver is under evaluation it may raise the attentiveness of the driver in critical situations (such as a hand-over situation) and ensure that the driver operates the vehicle safely after a "passive period". Moreover, the second user interface may comprise one or more graphical elements illustrating the second set of pre-cautionary constraints such as e.g., graphical representations of road edge boundaries, allowable distance to a lead vehicle. The graphical elements in the second user interface may further indicate the progress of the evaluation by for example indicating that the driver is showing poor steering stability, too late brake actuations, etc.

Figure 4:
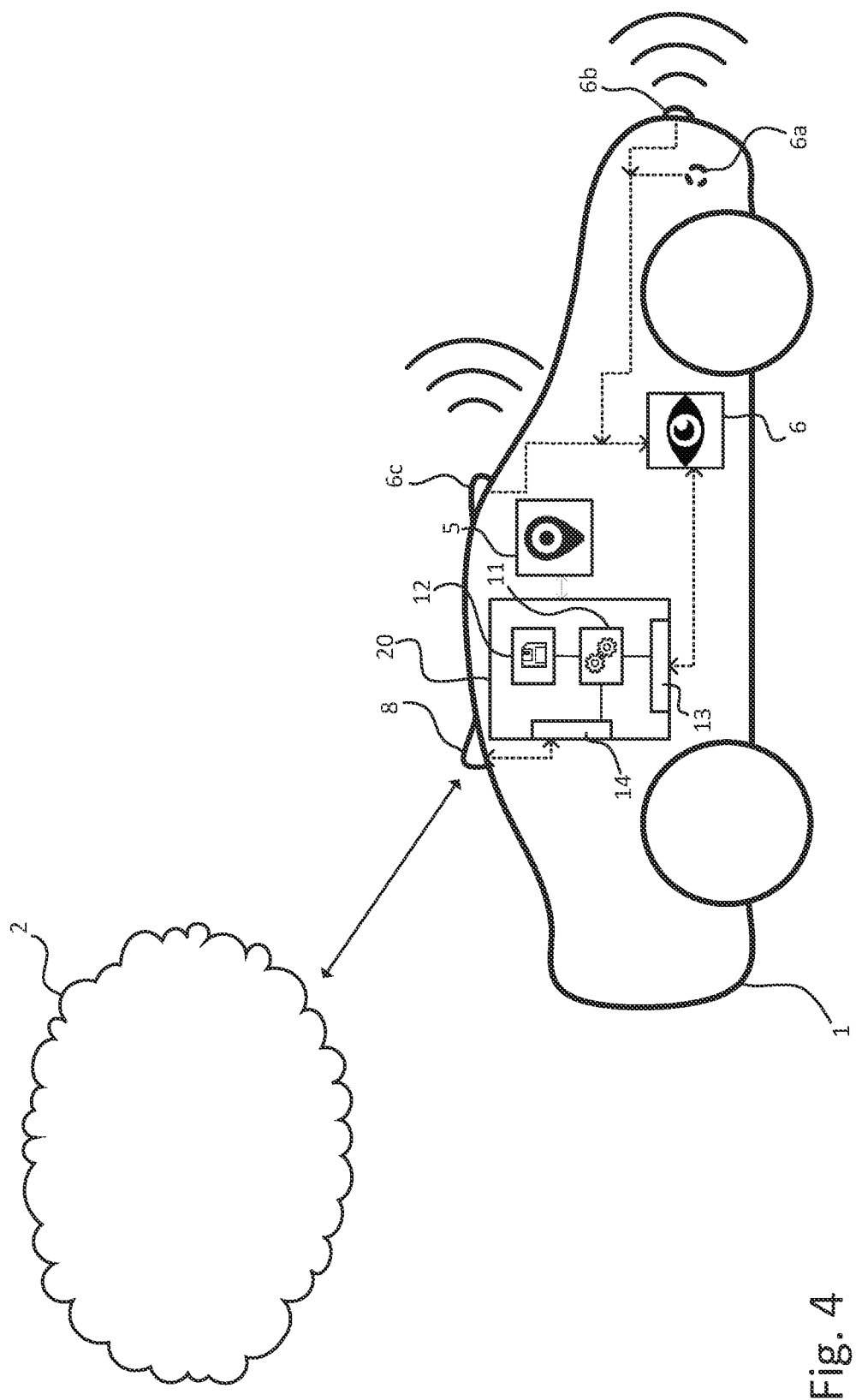
FIG. 4 is a schematic side-view of a vehicle comprising a system for managing a hand-over from an ADS feature to a driver of a vehicle in accordance with an embodiment of the present disclosure.

FIG. 4 is a schematic side view of a vehicle comprising an ADS module comprising an ADS feature configured to control steering, acceleration, and braking of the vehicle within a predefined Operational Design Domain, ODD, and a system 20 for managing a hand-over from an ADS feature to a driver of the vehicle according to any one of the embodiments disclosed herein. The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

The control system 20 comprises one or more processors 11, a memory 12, a sensor interface 13 and a communication interface 14. The processor(s) 11 may also be referred to as a control circuit 11, control unit 11, controller 11, or control circuitry 11. The control system 20 preferably comprises a number of software/hardware modules as described in the foregoing, here generalized as "control circuitry" 11. The control circuitry 11 is configured to execute instructions stored in the memory 12 to perform a method for controlling a vehicle according to any one of the embodiments disclosed herein. Stated differently, the memory 12 of the control system 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain a request to deactivate the ADS feature, and to provide partial control of the vehicle to the driver in order to enable manual driver operation of the vehicle based on the obtained request. The partial control comprises access to steering, acceleration, and braking of the vehicle while the PCS module imposes a second set of pre-cautionary constraints out of the plurality of pre-cautionary constraints for the driver while the driver has partial control of the vehicle. The control circuitry 11 is further configured to monitor the manual driver operation of the vehicle for a time period, evaluate the monitored manual driver operation of the vehicle against the second set of pre-cautionary constraints during the time period, and to deactivate the second set of pre-cautionary constraints if the manual driver operation passes the evaluation, or provide control of the vehicle to the ADS if the manual driver operation fails the evaluation.

Further, the vehicle 1 may be connected to external network(s) 2 via for instance a wireless link (e.g., for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g., IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 20) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 4 in the vehicle. The communication/antenna interface 13 may further provide the possibility to send output to a remote location (e.g., remote operator or control centre) by means of the antenna 5. Moreover, some sensors in the vehicle may communicate with the control device 10 using a local network setup, such as CAN bus, I2C, Ethernet, optical fibres, and so on. The communication interface 13 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, data indicative of the monitored manual driver operation may be evaluated outside of the vehicle and a signal indicative of the evaluation result may be sent back to the control system of the vehicle, provided that a sufficiently good connection may be achieved between the vehicle and the remote entity. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of monitoring and evaluating the manual driver operation may be performed concurrently as an evaluating step. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A method for managing a hand-over from an Automated Driving System (ADS) to a driver of a vehicle, wherein the ADS comprises an ADS feature being associated with a first set of pre-cautionary constraints out of a plurality of pre-cautionary constraints set by a Pre-Cautionary Safety System, while the ADS feature controls the vehicle, wherein the plurality of pre-cautionary constraints comprise a set of safety margins for lateral and longitudinal control of the vehicle, the method comprising:
   obtaining a request to deactivate the ADS feature;
   providing partial control of the vehicle to the driver in order to enable manual driver operation of the vehicle based on the obtained request, wherein the providing partial control comprises providing access to steering, acceleration, and braking of the vehicle to the driver while a second set of pre-cautionary constraints out of the plurality of pre-cautionary constraints is imposed for the driver while the driver is manually controlling steering, acceleration, and braking of the vehicle;
   monitoring the manual driver operation of the vehicle for a time period, wherein the manual driver operation comprises continuously controlling steering, acceleration or braking during at least a portion of the time period, wherein the time period is dynamically set based on a type of ADS feature that is to be deactivated, on a current Operational Design Domain (ODD), on a driver profile, or on a duration of time that the ADS feature has been active prior to the request to deactivate the ADS feature;
   evaluating the manual driver operation of the vehicle against the second set of pre-cautionary constraints during the time period in order to check whether the driver violates any one of the constraints comprised in the second set of pre-cautionary constraints,
   wherein the second set of pre-cautionary constraints comprises two groups of constraints, wherein a first group of the two groups of constraints comprises critical constraints and a second group of the two groups of constraints comprises non-critical constraints;
   in response to the driver not violating any constraint in the set of pre-cautionary constraints during the time period, determining that the driver has passed the evaluation and
   deactivating the second set of pre-cautionary constraints upon the expiry of the time period;
   in response to the driver violating a constraint in the first group of constraint of the second set of pre-cautionary constraints during the time period, determining that the driver has failed the evaluation and providing control of the vehicle to the ADS; and
   in response to the driver violating a constraint in the second group of constraints of the second set of pre-cautionary constraints:
   extending the time period,
   reducing an evaluation score of the driver, or
   temporarily controlling the vehicle using the ADS so to perform an intervention without aborting the evaluation of the manual driver operation.

2. The method according to claim 1, wherein the ADS comprises a Minimal Risk Condition (MRC) feature, and wherein the step of providing control of the vehicle to the ADS comprises:
   bringing the vehicle to the MRC, or
   resuming control of the vehicle to the ADS feature.

3. The method according to claim 1, wherein the step of evaluating the driver operation comprises continuously evaluating the manual driver operation during the time period; and
   wherein the step of providing control of the vehicle to the ADS comprises providing the control of the vehicle to the ADS when the manual driver operation fails the evaluation.

4. The method according to claim 1, further comprising:
   displaying on a display of an electronic device:
   a graphical representation of a first user interface while the ADS feature controls the vehicle;
   a graphical representation of a second user interface while the driver has partial control of the vehicle; and
   a graphical representation of a third user interface when the second set of pre-cautionary constraints are deactivated,
   wherein the first user interface, the second user interface, and the third user interface are different.

5. The method according to claim 1, wherein the first set of pre-cautionary constraints is different from the second set of pre-cautionary constraints.

6. The method according to claim 1, wherein the second set of pre-cautionary constraints comprises at least one of:

a sub-set of pre-cautionary constraints of the first set of pre-cautionary constraints;
a smaller number of pre-cautionary constraints than the first set of pre-cautionary constraints; and
a higher threshold for at least one pre-cautionary constraint out of the first set of pre-cautionary constraints.

7. The method according to claim 1, wherein the step of obtaining a request to deactivate the ADS feature comprises:
obtaining, from a Human-Machine-Interface (HMI) a driver-initiated request to deactivate the ADS feature; or
obtaining a machine-initiated request to deactivate the ADS feature.

8. The method according to claim 7, wherein the ADS feature is configured to operate within a specific ODD and wherein the step of obtaining a machine-initiated request to deactivate the ADS feature comprises:
obtaining sensor data indicative of an exit from the specific ODD; and
obtaining the machine-initiated request to deactivate the ADS feature in response to the obtained sensor data indicative of the exit from the specific ODD.

9. The method according to claim 1, wherein the second set of precautionary constraints comprises a set of safety margins associated with the manual driver operation of the vehicle, and wherein the evaluation of the manual driver operation comprises checking the manual driver operation of the vehicle for a violation of the set of safety margins.

10. A non-transitory computer storage medium storing one or more computer readable code which, when executed on one or more processors of a vehicle control system, cause the one or more processors carry out a method for managing a hand-over from an Automated Driving System (ADS) to a driver of a vehicle, wherein the ADS comprises an ADS feature being associated with a first set of pre-cautionary constraints out of a plurality of pre-cautionary constraints set by a Pre-Cautionary Safety System, while the ADS feature controls the vehicle, wherein the plurality of pre-cautionary constraints comprise a set of safety margins for lateral and longitudinal control of the vehicle, the method comprising:
obtaining a request to deactivate the ADS feature;
providing partial control of the vehicle to the driver in order to enable manual driver operation of the vehicle based on the obtained request, wherein the providing partial control comprises providing access to steering, acceleration, and braking of the vehicle to the driver while a second set of pre-cautionary constraints out of the plurality of pre-cautionary constraints is imposed for the driver while the driver is manually controlling steering, acceleration, and braking of the vehicle;
monitoring the manual driver operation of the vehicle for a time period, wherein the manual driver operation comprises continuously controlling steering, acceleration or braking during at least a portion of the time period, wherein the time period is dynamically set based on a type of ADS feature that is to be deactivated, on a current Operational Design Domain (ODD), on a driver profile, or on a duration of time that the ADS feature has been active prior to the request to deactivate the ADS feature;
evaluating the manual driver operation of the vehicle against the second set of pre-cautionary constraints during the time period in order to check whether the driver violates any one of the constraints comprised in the second set of pre-cautionary constraints, wherein the second set of pre-cautionary constraints comprises two groups of constraints, wherein a first group of the two groups of constraints comprises critical constraints and a second group of the two groups of constraints comprises non-critical constraints;
in response to the driver not violating any constraint in the set of pre-cautionary constraints during the time period, determining that the driver has passed the evaluation and
deactivating the second set of pre-cautionary constraints upon the expiry of the time period;
in response to the driver violating a constraint in the first group of constraint of the second set of pre-cautionary constraints during the time period, determining that the driver has failed the evaluation and providing control of the vehicle to the ADS; and
in response to the driver violating a constraint in the second group of constraints of the second set of pre-cautionary constraints:
extending the time period,
reducing an evaluation score of the driver, or
temporarily controlling the vehicle using the ADS so to perform an intervention without aborting the evaluation of the manual driver operation.

11. A system for managing a hand-over from an Automated Driving System (ADS) to a driver of a vehicle, wherein the ADS comprises an ADS feature, the system comprising:
control circuitry configured to:
obtain a request to deactivate the ADS feature while the ADS feature being associated with a first set of pre-cautionary constraints out of a plurality of pre-cautionary constraints set by a Pre-Cautionary Safety System, while the ADS feature controls the vehicle, wherein the plurality of pre-cautionary constraints comprise a set of safety margins for lateral and longitudinal control of the vehicle;
provide partial control of the vehicle to the driver in order to enable manual driver operation of the vehicle based on the obtained request, wherein the providing partial control comprises providing access to steering, acceleration, and braking of the vehicle to the driver while a second set of pre-cautionary constraints out of the plurality of pre-cautionary constraints is imposed for the driver while the driver is manually controlling steering, acceleration, and braking of the vehicle;
monitor the manual driver operation of the vehicle for a time period, wherein the manual driver operation comprises continuously controlling steering, acceleration or braking during at least a portion of the time period, wherein the time period is dynamically set based on a type of ADS feature that is to be deactivated, on a current Operational Design Domain (ODD), on a driver profile, or on a duration of time that the ADS feature has been active prior to the request to deactivate the ADS feature;
evaluate the manual driver operation of the vehicle against the second set of pre-cautionary constraints during the time period in order to check whether the driver violates any one of the constraints comprised in the second set of pre-cautionary constraints, wherein the second set of pre-cautionary constraints comprises two groups of constraints, wherein a first group of the two groups of constraints comprises critical constraints and a second group of the two groups of constraints comprises non-critical constraints;
in response to the driver not violating any constraint in the set of pre-cautionary constraints during the time period, determine that the driver has passed the evaluation and deactivate the second set of pre-cautionary constraints;
in response to the driver violating a constraint in the first group of constraint of the second set of pre-cautionary constraints during the time period, determine that the driver has failed the evaluation and provide control of the vehicle to the ADS; and
in response to the driver violating a constraint in the second group of constraints of the second set of pre-cautionary constraints:
  extend the time period,
  reduce an evaluation score of the driver, or
  temporarily control the vehicle using the ADS so to perform an intervention without aborting the evaluation of the manual driver operation.

12. The system according to claim 11, wherein the control circuitry is configured to:
evaluate the driver operation by continuously evaluating the manual driver operating during the time period; and
provide control of the vehicle to the ADS by providing the control of the vehicle to the ADS when the manual driver operation fails the evaluation.

13. The system according to claim 11, wherein the control circuitry is further configured to:
display on a display of an electronic device:
  a graphical representation of a first user interface while the ADS feature controls the vehicle;
  a graphical representation of a second user interface while the driver has partial control of the vehicle; and
  a graphical representation of a third user interface when the second set of pre- cautionary constraints are deactivated,
wherein the first user interface, the second user interface, and the third user interface are different.

14. The system according to claim 11, wherein the first set of pre-cautionary constraints is different from the second set of pre-cautionary constraints.

15. The system according to claim 11, wherein the second set of pre-cautionary constraints comprises at least one of:
a sub-set of pre-cautionary constraints of the first set of pre-cautionary constraints;
a smaller number of pre-cautionary constraints than the first set of pre-cautionary constraints; and
a higher threshold for at least one pre-cautionary constraint out of the first set of pre-cautionary constraints.

16. A vehicle comprising:
an Automated Driving System (ADS) comprising an ADS feature configured to control steering, acceleration, and braking of the vehicle within a predefined Operational Design Domain (ODD) and
a system for managing a hand-over from the ADS to a driver of a vehicle, the system comprising:
control circuitry configured to:
obtain a request to deactivate the ADS feature, wherein the ADS feature being associated with a first set of pre-cautionary constraints for the ADS feature set by a Pre-Cautionary Safety System, while the ADS feature controls the vehicle, wherein the plurality of pre-cautionary constraints comprise a set of safety margins for lateral and longitudinal control of the vehicle;
provide partial control of the vehicle to the driver in order to enable manual driver operation of the vehicle based on the obtained request, wherein the providing partial control comprises providing access to steering, acceleration, and braking of the vehicle to the driver while a second set of pre-cautionary constraints out of the plurality of pre-cautionary constraints is imposed for the driver while the driver is manually controlling steering, acceleration, and braking of the vehicle;
monitor the manual driver operation of the vehicle for a time period, wherein the manual driver operation comprises continuously controlling steering, acceleration or braking during at least a portion of the time period, wherein the time period is dynamically set based on a type of ADS feature that is to be deactivated, on a current Operational Design Domain (ODD), on a driver profile, or on a duration of time that the ADS feature has been active prior to the request to deactivate the ADS feature;
evaluate the manual driver operation of the vehicle against the second set of pre-cautionary constraints during the time period in order to check whether the driver violates any one of the constraints comprised in the second set of pre-cautionary constraints, wherein the second set of pre-cautionary constraints comprises two groups of constraints, wherein a first group of the two groups of constraints comprises critical constraints and a second group of the two groups of constraints comprises non-critical constraints;
in response to the driver not violating any constraint in the set of pre-cautionary constraints during the time period, determine that the driver has passed the evaluation and deactivate the second set of pre-cautionary constraints;
in response to the driver violating a constraint in the first group of constraint of the second set of pre-cautionary constraints during the time period, determine that the driver has failed the evaluation and provide control of the vehicle to the ADS; and
in response to the driver violating a constraint in the second group of constraints of the second set of pre-cautionary constraints:
  extend the time period,
  reduce an evaluation score of the driver, or
  temporarily control the vehicle using the ADS so to perform an intervention without aborting the evaluation of the manual driver operation.

17. The system according to claim 11, wherein the second set of precautionary constraints comprises a set of safety margins associated with the manual driver operation of the vehicle, and wherein the evaluation of the manual driver operation comprises checking the manual driver operation of the vehicle for a violation of the set of safety margins.

* * * * *